United States Patent [19]

Miller

[11] Patent Number: 5,316,361
[45] Date of Patent: May 31, 1994

[54] EXPANDABLE VISOR

[75] Inventor: Douglas C. Miller, Hersey, Mich.

[73] Assignee: Plasta Fiber Industries Corp., Marlette, Mich.

[21] Appl. No.: 8,694

[22] Filed: Jan. 25, 1993

[51] Int. Cl.⁵ .............................................. B60J 3/02
[52] U.S. Cl. ................................................. 296/97.8
[58] Field of Search ..................... 296/97.8, 79.4, 79.6

[56] References Cited

U.S. PATENT DOCUMENTS

| | | | |
|---|---|---|---|
| 4,195,876 | 4/1980 | Timperio | 296/97 |
| 4,317,589 | 3/1982 | Kuss | 296/97 |
| 4,323,275 | 4/1982 | Lutz | 296/97 |
| 4,486,819 | 12/1984 | Marcus et al. | 362/142 |
| 4,580,829 | 4/1986 | Matheopoulos | 296/97 |
| 4,624,499 | 11/1986 | Flowerday | 296/97 |
| 4,690,451 | 9/1987 | Killar | 296/97.7 |
| 4,728,142 | 3/1988 | Gavagan | 296/97.8 |
| 4,783,111 | 11/1988 | Hemmeke et al. | 296/97.8 |
| 4,792,176 | 12/1988 | Karford | 296/97.8 |
| 4,824,161 | 4/1989 | Lee | 296/97.8 |
| 4,828,314 | 5/1989 | Gavagan | 296/97.8 |
| 4,858,982 | 8/1989 | Dykstra et al. | 296/97.5 |
| 4,902,062 | 2/1990 | Pusic et al. | 296/97.4 |
| 5,042,867 | 8/1991 | Crotty et al. | 296/97.8 |
| 5,061,938 | 5/1991 | Tschan | 296/97.8 |
| 5,104,174 | 9/1992 | Gute | 296/97.4 |

FOREIGN PATENT DOCUMENTS

| | | |
|---|---|---|
| 2332613 | 1/1975 | Fed. Rep. of Germany . |
| 3421850 | 12/1985 | Fed. Rep. of Germany . |
| 445793 | 4/1936 | United Kingdom . |

*Primary Examiner*—Robert R. Song
*Attorney, Agent, or Firm*—Brooks & Kushman

[57] ABSTRACT

A visor extender for use in combination with a vehicle visor which has a visor defining an internal cavity for housing a sheath which defines a channel and an opening. A blade which has a first end and a second end is movable along the channel between a retracted position substantially within the cavity and an extended position outside of the cavity. A grip means is located adjacent the first end of the blade for selectively moving the blade between the retracted position and the extended position. A limiting means is provided which cooperates with an opening in the sheath to limit movement of the blade in the extended position. A guide means is provided on the blade adjacent the second end for guiding movement of the blade on the sheath as the blade moves in the channel between the retracted position and the extended position.

16 Claims, 2 Drawing Sheets

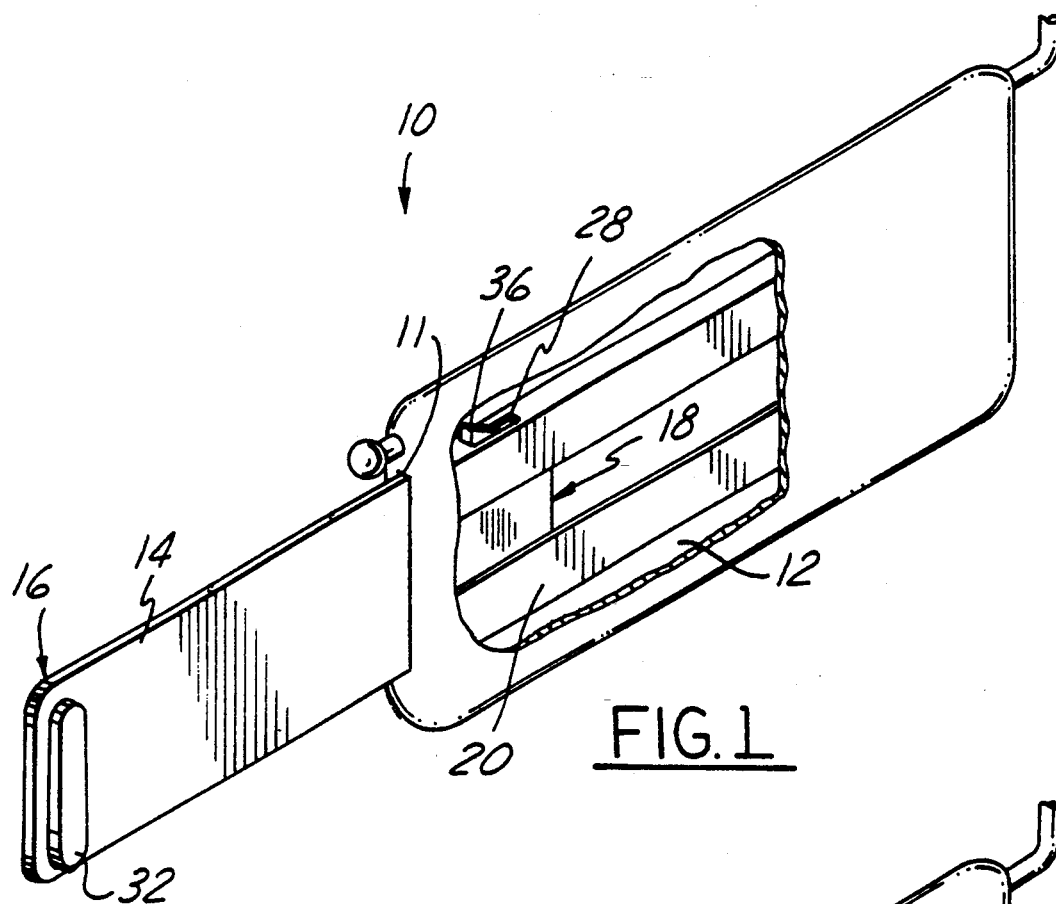
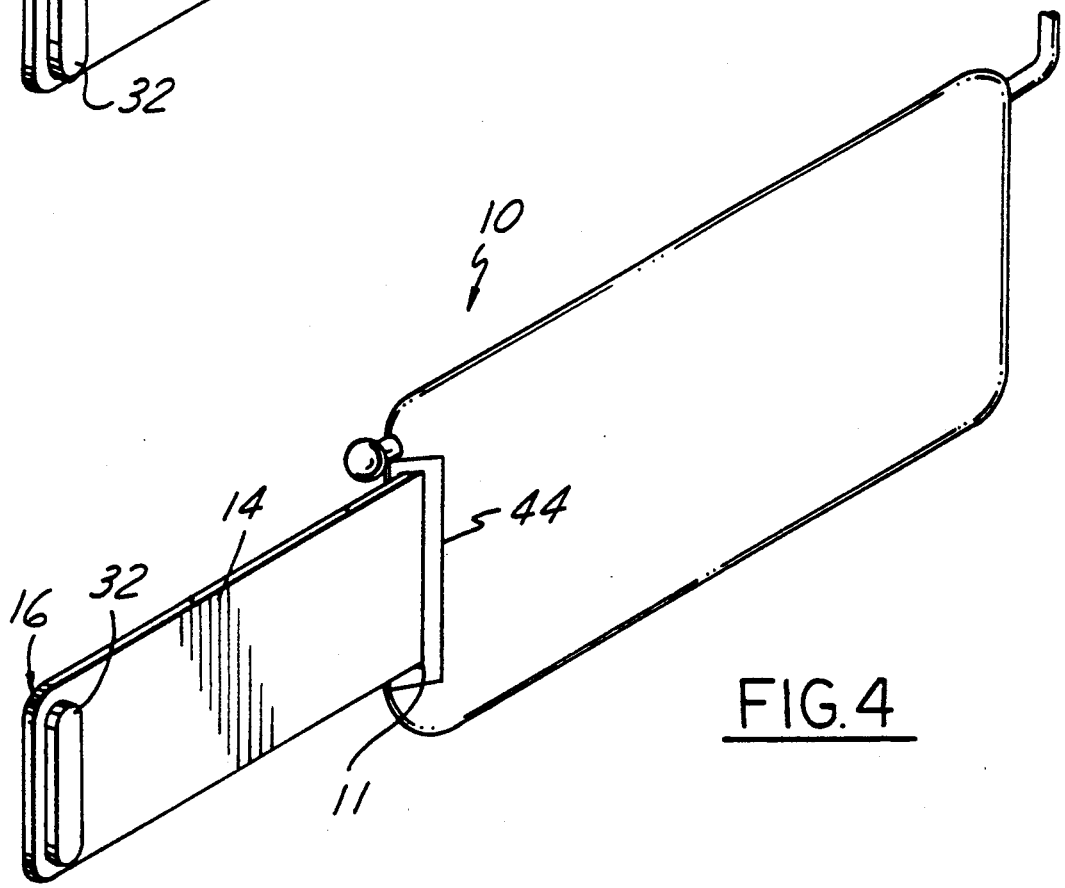

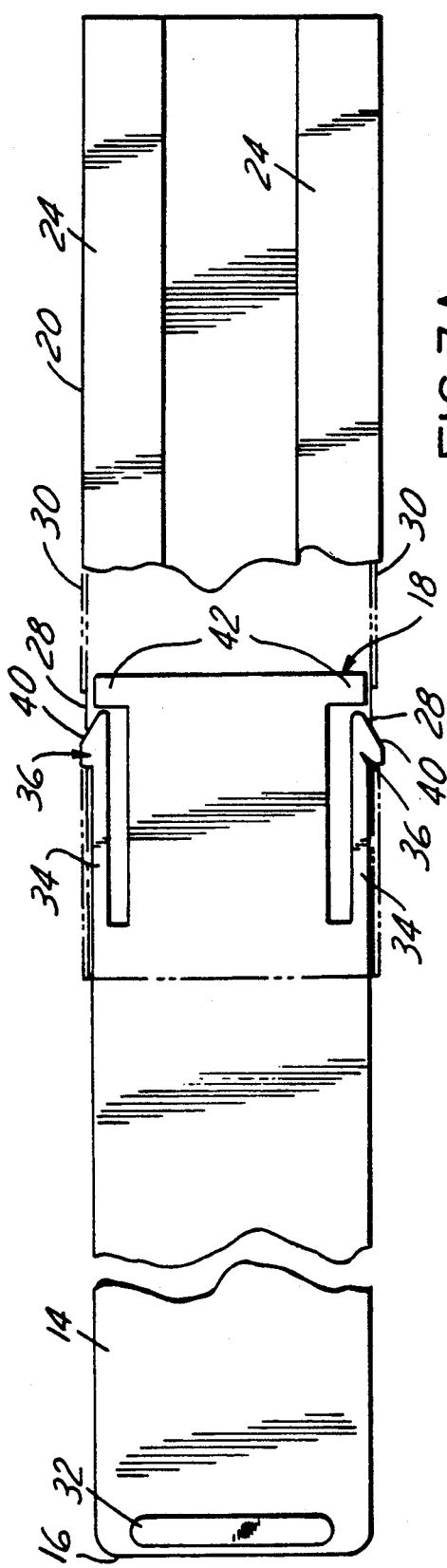
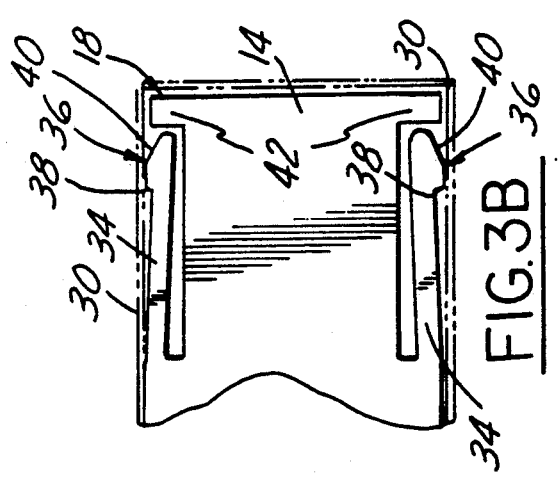
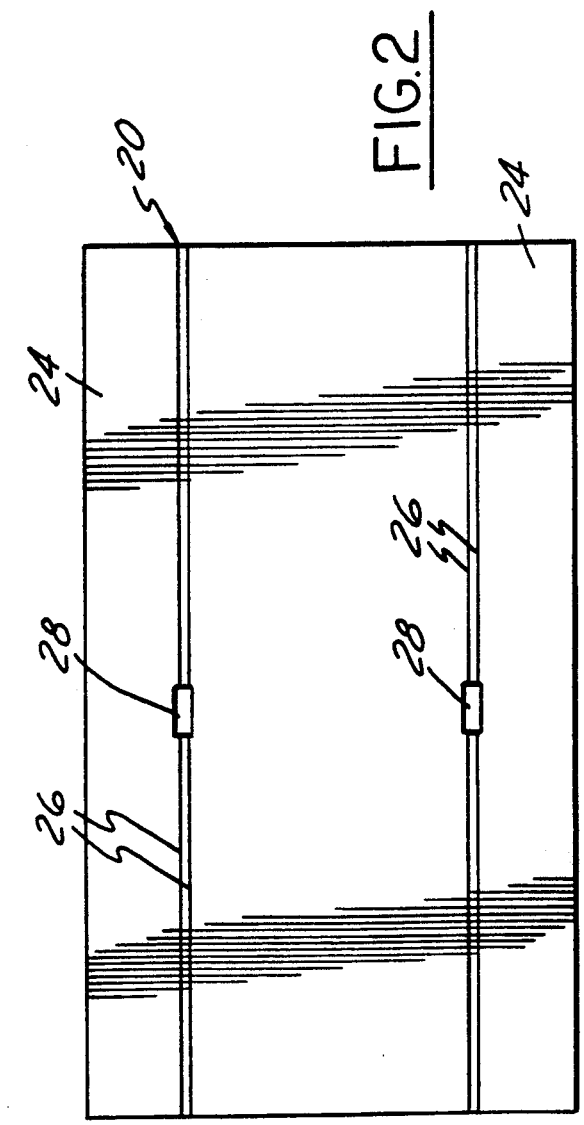

EXPANDABLE VISOR

TECHNICAL FIELD

This invention relates to visors and, in particular, a visor having a single extendable blade to assist in blocking or screening out glare caused by the sun or other sources of light.

BACKGROUND ART

Visors are included as original equipment furnished with a motor vehicle to be disposed for extension across the windshield area of a motor vehicle in order to shield the driver and other occupant from the glare of the sun or alternative sources of light. Conventional visors do not provide uncomplicated and reliable methods of providing such protection from the sun's rays or other sources of light.

Numerous approaches have been taken in an attempt to address the problem. For example, U.S. Pat. No. 4,323,275 to Lutz discloses a housing having an auxiliary visor connected at two locations to the o visor originally mounted on the motor vehicle. Limiting stops having a lug sliding in an associated slot is used to prevent complete withdrawal of the auxiliary visors. In this construction, modification of the original visor is required to properly mount the housing containing the auxiliary visors. Furthermore, the mounting of the additional housing increases the thickness of the visor, thereby interfering with the positioning of the visor in the stored position.

U.S. Pat. No. 4,580,829 to Matheopoulos discloses an adjustable bi-directional vehicle visor pivotally mounted to the vehicle adjacent the windshield allowing horizontal rotation between a stored position and an operating position. The device has an opaque first visor and a second transparent tinted visor which overlays the first visor in the stored position and is selectively pivotable about the first visor when in an operating position to permit shielding both at the front and sides simultaneously. The second visor may also be positioned in parallel alignment below the first visor. In this construction, the visor is incapable of providing additional glare protection axially from the visor.

U.S. Pat. No. 4,728,142 and U.S. Pat. No. 4,828,314 to Gavagan discloses a visor assembly having one or more retractable glare screens integrated with the visor so as to be extended and retracted from the visor as required. The glare screens are guided for retracted movement by slot followers travelling in elongated guide slots formed in the visor center board member. In this configuration, a slot follower is required to limit travel of the blades. In addition, such a configuration is intended for use with a visor having a center board member.

U.S. Pat. No. 4,792,176 to Karford discloses a visor extension unit which is adapted for releasable attachment to a conventional visor of a motor vehicle. The device includes a support frame having opposed surfaces and means for attaching one of the surfaces to the body of the visor. A pair of guide passages at opposite ends of the unit enable the visor panel to be manually moved in a horizontal direction extending either from the left side or the right side based on the location of the sun. In this construction, no limiting means exists for preventing the visor from being pulled completely outside the visor.

U.S. Pat. No. 4,824,161 to Lee discloses an automobile visor having a vertical series of pivotally connected shield plates which are suspended from a horizontal hanging portion of a hanging rod rotatably mounted on a roof panel. The shield plates are in horizontal alignment when unfolded, each containing a side slot having a side plate horizontally extendable therefrom. In this construction, it is necessary to unfold at least one plate and then extend the insert horizontally to protect against glare. Furthermore, in this construction, no limiting means is provided for retaining the blade within one of the connected shield plates.

German Patent No. 23 32 613 to Vreeswijk discloses a vehicle visor having a handle to extend secondary blades in both the horizontal and vertical planes simultaneously by movement of a single lever. This construction is incapable of enabling movement of the single blade without simultaneous movement of the other blade.

German Patent No. DE 3421 850 to Heuckmann discloses an extra blade for an automobile visor which provides additional glare protection below the visor in the use position. In this configuration, the blade is retained within the slot by means and extensions on the secondary blade which abut shoulders adjacent the opening providing access to an internal section.

An alternative approach has been adopted by Prince Corporation which utilizes a follower on the blade cooperating with a track integrally formed in the opposing shell half. The predetermined length of the track controls the extension of the blade.

The present invention incorporates many of the known benefits of an extendable visor while improving the internal components used to manufacture the visor as well as improving the ease of use for the occupant.

SUMMARY OF THE INVENTION

A visor extender is provided in combination with a vehicle visor. A visor is provided which defines an internal cavity which has an aperture located along an external surface of the visor to provide access to the internal cavity. A sheath is provided which is located within the cavity such that the sheath defines a channel and an opening. A blade which has a first end and a second end which is movable along the channel between a retracted position substantially within the cavity and an extended position substantially outside of the cavity. A grip means is located adjacent the first end for selectively moving the blade between the retracted position and the extended position. A limiting means is provided which is located adjacent the second end. The limiting means cooperates with the opening to limit movement of the blade beyond the extended position. Guide means is provided on the blade adjacent the second end for guiding movement of the blade on the sheath as the blade moves in the channel between the retracted position and the extended position.

In addition, a visor extender is provided for use with a vehicle visor which has a sheath defining a channel and an opening. A blade is provided which is movable along the channel between a retracted position substantially within the visor and an extended position substantially outside of the visor. A limiting means located adjacent the second end is provided. The limiting means cooperates with the opening for limiting movement of the blade in an extended position. A guide means is provided which is located on the blade adjacent the second end for guiding movement of the blade as the blade moves between the retracted position and the extended position.

Furthermore, a slidable visor extender is provided. The visor extender has a sheath located within the visor such that the sheath defines an opening and a channel. A blade is provided which is slidable within the channel between a retracted position substantially within the visor and an extended position substantially outside the visor. The blade has a first end and a second end. A handle is located adjacent the first end for selectively moving the blade relative the visor between the retracted position and the extended position. A tang is located on the blade adjacent the second end such that the tang cooperates with an opening for retaining the blade within the visor when the blade is in the extended position. A foot is located on the blade adjacent the second end for controlling movement of the blade between the retracted position and the extended position.

Accordingly, it is an object of the present invention to provide a visor extender capable of moving between a retracted position and an extended position along a channel formed by a sheath.

A further object of the present invention is to provide an inexpensive visor extender capable of being used with conventional visors.

A further object of the present invention is to provide an improved limiting means for limiting movement of a blade relative to a visor when the blade is in the extended position.

The objects, benefits and advantages of the present invention will become apparent to those skilled in the art to which this invention relates as set forth in the subsequent detailed description of the invention when taken in conjunction with the drawings and the accompanying claims.

BRIEF DESCRIPTION OF THE DRAWINGS

FIG. 1 is a perspective view partially cutaway showing the expandable visor of the present invention;

FIG. 2 is a plan view of the sheath in its prefolded condition;

FIG. 3A is a plan view partially cut-away showing the blade in the extended position wherein the tangs are engaging the opening located in the sheath to limit movement of the blade in the extended position;

FIG. 3B is a partial plan view in cut-away showing the tangs being biased inward by the sheath when the blade is in the retracted position in accordance with the present invention; and FIG. 4 is an alternative embodiment of the present invention showing a bezel providing additional stability for the blade.

BEST MODE FOR CARRYING OUT THE INVENTION

The preferred embodiment shown in FIGS. 1 through 3A illustrate a visor generally indicated at 10. The visor 10 is of a type normally appearing as standard equipment on vehicles. The visor 10 can be of various constructions which form a cavity 12 (shown in FIG. 1). The visor 10, in this embodiment, includes a blade, generally indicated at 14. The blade 14 is axially slidable relative to the visor 10 through an aperture 11 located at an end of the visor 10 in a direction perpendicular to the line of travel of the blade 14. The aperture 11 provides access to the cavity 12 of the visor 10.

As shown in FIGS. 1 and 4, the blade 14 is generally rectangular in shape and when mounted within the visor 10 has the same general orientation as the visor 10. The blade 14 has a first end generally indicated at 16 and a second end generally indicated at 18.

A generally rectangular sheath 20, shown best in FIG. 2, is a single unit which is formed from a body 22 and flanges 24 located on two opposite sides of the body 22. Living hinges 26 are located in pairs between the flanges 24 and the body 22. A pair of openings 28 are located on opposite sides of the body 22. As shown in FIGS. 2 and 3A, the flanges 24 are folded back against the body 22 by means of the living hinges 26. Once folded, the flanges 24 in conjunction with the body 22 form a channel 30 in which the blade 14 travels. The end of the sheath 20 adjacent the aperture 11 is open and cooperates with the aperture 11 to allow the blade 14 to travel back and forth along the channel 30. The sheath 20 is inserted into the cavity 12 of the visor 10 prior to the formation thereof.

As may be seen in FIGS. 1, 3A and 4, a handle 32 or other means for gripping the blade 14 is provided at the first end 16. The handle 32 is use to move the blade 14 between a retracted position substantially within the visor 10 and an extended position substantially outside of the visor 10. The blade 14 travels in the channel 30 along an axis generally parallel to a longitudinal axis of the visor 10. The second end 18 of the blade 14 is generally T-shaped. The base of the T shape is substantially larger than the corresponding top of the T shape. The T-shaped second end 18 results from forming a pair of tangs 34 from opposed sides of the second end 18 of the blade 14. The tangs 34 are formed such that each tang 34 is biased outward away from the blade 14. Each tang 34 has a head 36 which has a shoulder 38 cooperating with its corresponding opening 28 to limit the movement of the blade 14 so as to prevent the blade 14 from being completely removed from the sheath 20 of visor 10. Each head 36 has a ramp 40 located adjacent the shoulder 38 which cooperates with its respective opening 28 to cam the tang 34 against the bias moving the tang 34 toward the blade 14 allowing the blade 14 to move toward the retracted position.

A pair of feet 42 are integrally formed in the second end 18 of the blade 14 at the top of the T-shaped second end 18. The feet 42 cooperate with the channel 30 to guide the blade 14 as it moves between the retracted position and the extended position. In addition, the feet 42 limit the blade 14 from rocking perpendicular to its line of slidable movement when the blade 14 is in the extended position. The feet 42 ensure uniform movement of the blade 14 throughout the range of travel.

In operation, once the blade 14 and the sheath 20 have been located within the visor 10, an operator grips the handle 32 and pulls the blade 14 from the retracted position to a desired position relative to the visor 10. As the operator pulls the blade 14, the tangs 34 and the feet 42 slide against the channel 30 to provide for smooth pressure and movement of the blade 14 within the sheath 20. This pressure also prevents rattling or vibration of the blade. If the operator continues to pull the blade 14 toward the extended position, the tangs 34 will come into contact with the openings 28 and overcome the bias. The shoulder 38 of each tang 34 will engage its respective opening 28 and limit the outward travel of the blade 14 relative to the visor 10. To move the blade 14 toward the retracted position, the operator need only apply pressure to the blade 14, preferably at the handle 32 and push the blade 14 toward the visor through the aperture 11. The ramps 40 on the tangs 34 will cam the tangs 34 out of the openings 28 back toward the blade 14 to allow the blade 14 to move smoothly toward the retracted position.

In an alterative embodiment shown in FIG. 4, a bezel 44 is utilized at the aperture 11 to provide additional stability for the blade 14 and to dress-up the edges of the aperture 11.

While the preferred embodiment of the present invention has been described in detail, those familiar with the art to which this invention relates will recognize various alternative designs and embodiments for practicing the invention as defined by the following claims and drawings.

I claim:

1. A visor extender in combination with a vehicle visor, said visor extender comprising:
   a visor defining an internal cavity and having an aperture located along an external surface of the visor for providing access to said internal cavity;
   a sheath located within said cavity, said sheath defining a channel and a pair of openings;
   a blade defining a first end and a second end, said blade movable along said channel between a retracted position substantially within said cavity and an extended position substantially outside of said cavity;
   a pair of tangs located on said blade adjacent said second end, said tangs are biased away from said blade towards said sheath providing control friction against said sheath enabling even slidable movement of said blade throughout its movement, and said pair of tangs engage said pair of openings in said sheath as said blade moves toward said extended position to prevent said blade from being completely removed from said visor; and
   guide means located on said blade for guiding movement of said blade on said sheath as said blade moves in said channel between said retracted position and said extended position.

2. The visor extender of claim 1 further comprising grip means located adjacent said first end for selectively moving said blade between said retracted position and said extended position.

3. The visor extender of claim 1 wherein said guide means includes a pair of feet located at opposed ends of said second end limiting rocking movement of said blade when said blade is moved between said retracted position and said extended position.

4. A visor extender in combination with a vehicle visor, said visor extender comprising:
   a visor defining an internal cavity and having an aperture located along an external surface of the visor for providing access to said internal cavity;
   a sheath located within said cavity, said sheath defining a channel and an opening;
   a blade defining a first end and a second end, said blade movable along said channel between a retracted position substantially within said cavity and an extended position substantially outside of said cavity;
   grip means located adjacent said first end for selectively moving said blade between said retracted position and said extended position;
   a pair of tangs located on said blade adjacent said second end, said tangs are biased away from said blade toward said sheath providing controlled friction against said sheath providing even slidable movement of said blade throughout its movement, and said pair of tangs engage said pair of openings in said sheath as said blade moves toward said extended position to prevent said blade from being completely removed from said visor; and
   guide means located on said blade adjacent said second end for guiding movement of said blade on said sheath as said blade moves in said channel between said retracted position and said extended position.

5. The visor extender of claim 4 wherein said blade has a generally rectangular configuration and has a similar orientation as said visor.

6. The visor extender of claim 4 wherein said blade is axially movable along a axis generally parallel to said longitudinal axis of said visor.

7. The visor extender of claim 4 wherein said opening comprises a pair of openings oriented on opposed sides of said blade adjacent said second end.

8. The visor extender of claim 4 wherein said guide means comprises a pair of feet located at opposed ends of said second end limiting rocking movement of said blade when said blade is moved between said retracted position and said extended position.

9. The limiting means of claim 4 wherein said pair of tangs are located distal from said second end relative said pair of feet.

10. The limiting means of claim 4 wherein each of said pair of tangs has a free end and a fixed end, each said free end has a ramp providing a camming action forcing each tang of said pair of tangs inwardly to disengage said pair of openings when said blade is moved from said extended position allowing movement of said blade toward said retracted position.

11. The visor extender of claim 4 wherein said sheath is constructed of a single member having a plurality of flanges and a plurality of living hinges, said plurality of flanges enabling said plurality of flanges to be folded relative each other to form the channel for retaining said blade.

12. The visor extender of claim 4 further including a bezel cooperating with said visor and said sheath to provide additional stability during movement of said blade and to make said aperture more aesthetically appealing.

13. A visor extender for use with a vehicle visor, said extender comprising:
   a sheath defining a channel;
   a blade movable along said channel between a retracted position substantially within said visor and an extended position substantially outside of said visor;
   a pair of tangs located on said blade adjacent said second end, said tangs are biased away from said blade towards said sheath providing control friction against said sheath enabling even slidable movement of said blade throughout its movement, and said pair of tangs engage said pair of openings in said sheath as said blade moves toward said extended position to prevent said blade from being completely removed from said visor; and
   guide means located on said blade for guiding movement of said blade as said blade moves between said retracted position and said extended position.

14. A slidable visor extender cooperating with a vehicle visor, said visor extender comprising:
   a sheath located within said visor, said sheath defining an opening and a channel;
   a blade slidable within said channel of said sheath between a retracted position substantially within said visor and an extended position substantially outside of said visor, and said blade having a first end and a second end;

a handle located adjacent said first end for selectively moving said blade relative said visor between said retracted position and said extended position;

a pair of tangs located on said blade adjacent said second end, said tangs are biased away from said blade towards said sheath providing control friction against said sheath providing an even slidable movement of said blade throughout its movement, and said pair of tangs engage said pair of openings in said sheath as said blade moves toward said extended position to prevent said blade from being completely removed from said visor; and guide means located on said blade adjacent said second end for controlling movement of said blade between said retracted position and said extended position.

15. The visor extender of claim 14 further comprising grip means located adjacent said first end for selectively moving said blade between said retracted position and said extended position.

16. The visor extender of claim 14 wherein said guide means includes a pair of feet located at opposed ends of said second end limiting rocking movement of said blade when said blade is moved between said retracted position and said extended position.

* * * * *